(12) United States Patent
Charlesworth et al.

(10) Patent No.: US 11,402,038 B2
(45) Date of Patent: Aug. 2, 2022

(54) END FITTING FOR A COMPOSITE PIPE

(71) Applicant: Magma Global Limited, Portsmouth (GB)

(72) Inventors: David Charlesworth, Emsworth (GB); Luke Rumsey, Fareham (GB)

(73) Assignee: Magma Global Limited, Portsmouth (GB)

( * ) Notice: Subject to any disclaimer, the term of this patent is extended or adjusted under 35 U.S.C. 154(b) by 268 days.

(21) Appl. No.: 16/625,639

(22) PCT Filed: Jun. 20, 2018

(86) PCT No.: PCT/GB2018/051710
§ 371 (c)(1),
(2) Date: Dec. 20, 2019

(87) PCT Pub. No.: WO2018/234790
PCT Pub. Date: Dec. 27, 2018

(65) Prior Publication Data
US 2020/0158267 A1    May 21, 2020

(30) Foreign Application Priority Data
Jun. 22, 2017 (GB) ..................... 1709966

(51) Int. Cl.
*F16L 47/14* (2006.01)
*F16L 11/08* (2006.01)
(Continued)

(52) U.S. Cl.
CPC .......... *F16L 11/082* (2013.01); *E21B 17/085* (2013.01); *F16L 23/024* (2013.01); *F16L 33/01* (2013.01); *F16L 47/14* (2013.01)

(58) Field of Classification Search
CPC ......... F16L 33/00; F16L 33/01; F16L 33/003; F16L 11/08; F16L 23/024; F16L 47/14; F16L 23/00
(Continued)

(56) References Cited

U.S. PATENT DOCUMENTS

2009/0223586 A1   9/2009  Vo
2009/0250925 A1*  10/2009 Eccleston ............... F16L 33/01
                                          285/222.4
(Continued)

FOREIGN PATENT DOCUMENTS

EP    2 492 571    8/2012
FR    2 641 841    7/1990
(Continued)

OTHER PUBLICATIONS

American Petroleum Institute standard API 17J, "Specification for Unbonded Flexible Pipe," 3d ed. 2008.
(Continued)

*Primary Examiner* — Patrick F Brinson
(74) *Attorney, Agent, or Firm* — Levy & Grandinetti

(57) ABSTRACT

An apparatus for terminating a composite pipe has a pipe having a liner layer surrounded by a composite layer and a pipe end. The liner layer has an extension piece which extends axially beyond the composite layer at the pipe end; a connector; an annular transition element located between the pipe end and the connector, the annular transition element having an exterior surface; and compression means.

19 Claims, 2 Drawing Sheets

(51) Int. Cl.
*E21B 17/08* (2006.01)
*F16L 23/024* (2006.01)
*F16L 33/01* (2006.01)

(58) Field of Classification Search
USPC ............... 138/134, 135, 109, 141, 137, 140;
285/245, 364, 337
See application file for complete search history.

(56) References Cited

U.S. PATENT DOCUMENTS

| | | | |
|---|---|---|---|
| 2010/0011556 A1* | 1/2010 | Eccleston | F16L 33/01 |
| | | | 29/428 |
| 2013/0192706 A1* | 8/2013 | Poirette | F16L 13/04 |
| | | | 138/109 |
| 2014/0312612 A1 | 10/2014 | Dhagat et al. | |
| 2015/0330890 A1* | 11/2015 | Clevelario | F16L 33/16 |
| | | | 73/49.5 |
| 2017/0356573 A1* | 12/2017 | Graves | F16L 37/02 |
| 2019/0226614 A1* | 7/2019 | Carney | F16L 33/01 |
| 2020/0080674 A1* | 3/2020 | Clements | F16L 33/01 |
| 2021/0156499 A1* | 5/2021 | Leger | F16L 33/01 |

FOREIGN PATENT DOCUMENTS

| | | |
|---|---|---|
| FR | 2 816 389 | 5/2002 |
| GB | 2 439 146 | 12/2007 |
| WO | WO 2012/079993 | 6/2012 |
| WO | WO 2012/095633 | 7/2012 |

OTHER PUBLICATIONS

Det Norske Veritas and Germanischer Lloyd Recommended Practice DNVGL-RP-F119, "Thermoplastic composite pipes," 2015.

\* cited by examiner

END FITTING FOR A COMPOSITE PIPE

FIELD OF THE INVENTION

The invention relates to an end fitting for a composite pipe of the type used in the oil and gas industry to extract fluid hydrocarbons from subterranean and sub-sea locations. Such pipes and such end fittings are required to operate in hostile environments which may include one or more of high temperature, high pressure, high salinity and high acidity conditions.

DESCRIPTION OF THE RELATED ART

Subsea oil and gas drilling and development employs pipes to transport liquid and/or gaseous hydrocarbons from the seabed to the sea surface and to transport injection fluids from the surface to the seabed. These pipes were typically made from steel or from unbonded layers of materials, such as one or more layer(s) of steel wires combined with a plastic liner, which together form a flexible, unbonded steel pipe. Such unbonded, flexible pipes are covered by American Petroleum Institute standard API 17J.

Over time, the subsea depths at which hydrocarbons are extracted has tended to increase. This development has been accompanied by a need to handle more aggressive fluids, higher operating pressures and harsher environmental conditions. In order to address these challenges, the industry has turned to composite pipes, comprising fibre-reinforced thermoplastic polymer. Reference may be made to WO 2012/079993 A1 which discloses such composite pipes. These pipes are typically lighter and better able to withstand the more severe environments as well as the more complex dynamic loading conditions including tension, bending and internal/external pressure found deep below the sea surface. Det Norske Veritas and Germanischer Lloyd (DNV GL) standard DNVGL-RP-F119 relates to thermoplastic composite pipes for offshore applications.

If a composite pipe is used as a subsea flowline, then a contrary challenge may occur, in that the pipe's low specific gravity may allow it to become buoyant and not remain on the sea floor. Similarly, a composite riser may be unstable when subjected to sea currents and may sway significantly if its specific gravity is too low. An armouring layer of spirally wound metal wires may be added to increase the specific gravity of the whole construction to an acceptable level. Aside of providing additional protection to the pipe, a further benefit of doing this is that other properties of the pipe, such as its tensile strength, may be tailored to specific needs. Typically, an even number of layers, at least two, of spirally-wound wire armouring is provided, with each successive layer generally being wound at the opposite angle (to the longitudinal axis of the pipe) to the preceding layer. The angle to the longitudinal axis is typically between 10 and 40 degrees. An even number of layers is usually provided to stabilize the pipe in torsion.

A further obstacle to the introduction of such composite pipes has been the ability to reliably terminate such pipes and to reliably connect them to non-composite piping and apparatus at both subsea and surface interfaces. Composite pipe terminations and connections must be able to provide a reliable transition from the composite pipe material to a standard steel pipe, which may typically incorporate a steel flange or hub connection. The different structural properties of the two materials on the one hand and the differences in thermal expansion on the other, may make it challenging to effect both a reliable structural and sealing connection.

Pipe end-fittings are known from GB 2 439 146 A and EP 2 492 571 A2. Both of these documents relate to flexible steel, unbonded pipe of the type discussed above. Although such flexible pipes may comprise multiple layers including steel and polymer layers, the pipes are, at heart, steel pipes and not composite pipes as presently defined. As a result of these pipes being fundamentally steel pipes, the problems of providing an end-fitting to a composite pipe do not arise. The end fitting generally comprises a steel flange attached to the underlying steel carcass, which is a metal-to-metal connection. US 2014/0312612 A1 (Dhagat) also relates to end fittings for flexible, unbonded pipes, so similar considerations apply. Since there is no unitary "pipe", but rather an assembly of unbonded layers, the end-fitting cannot be attached not to the unitary pipe and the problems which occur when attaching a steel end-fitting to a composite pipe do not occur.

Reference may also be made to WO 2012/095633 A1, which discloses an end-fitting for a composite pipe.

It is against this background that the present invention has been devised.

SUMMARY OF THE INVENTION

According to the invention, an apparatus for terminating a composite pipe is provided, comprising:
- a pipe having a liner layer surrounded by a composite layer and a pipe end, the liner layer comprising an extension piece which extends axially beyond the composite layer at the pipe end;
- a connector;
- an annular transition element located between the pipe end and the connector, the annular transition element having an exterior surface;
- compression means;

the pipe, the annular transition element and the connector being in fluid communication with one another, to allow the passage of fluid therethrough; whereby the compression means compresses the extension piece into sealing engagement with the exterior surface of the annular transition element.

As used herein, the term "composite" used, for example, in relation to the "composite pipe" means a polymer matrix comprising reinforcing fibres, especially wound fibres, more especially continuous, wound fibres.

The polymer comprised within the composite is advantageously a thermoplastic polymer and preferably comprises and more preferably consists of polyether ether ketone (PEEK). The reinforcing fibres comprised within the composite are advantageously carbon fibres, glass fibres, or mixtures thereof and are more preferably carbon fibres.

Advantageously, the composite layer is made of pre-formed tapes of composite material comprising axially-aligned fibres, which are advantageously continuous fibres. The tapes are bonded to the liner and then wound in layers with application of heat to cause the first layer to bond to the liner and subsequent layers to bond to one another. Winding is advantageously performed spirally, resulting in the fibres also being spirally wound within the composite layer.

The liner layer advantageously comprises and preferably consists of the same material as the matrix of the composite in the composite layer. By using the same material, a strong bond between the liner layer and the composite layer may be ensured. Advantageously, the liner layer consists of PEEK.

The extension piece is a length of liner layer which extends axially beyond composite layer at the pipe end, typically by about 30 cm, although it may be more or less, depending, for example, upon the diameter of the pipe and the dimensions of the annular transition element.

As mentioned, the compression means compresses the extension piece into sealing engagement with the exterior surface of the annular transition element. Typically, a sufficient pressure is applied to the liner layer for the compressive forces to reduce its thickness radially by 15-25%.

Advantageously, the exterior surface of the annular transition element comprises a chamfered portion contiguous with the pipe end. The compression means compresses the extension piece into sealing engagement with the chamfered portion.

The connector may be a hub or flange and is preferably a flange. Preferably, the connector additionally comprises a collar, which extends around the annular transition element and the pipe end and is radially spaced from the pipe end and radially spaced from at least a portion of the exterior surface of the annular transition element contiguous with the pipe end to define an annular gap. The collar has an end face which may advantageously be aligned perpendicularly to the axis of the pipe. The connector is typically made of metal and is preferably made of steel.

In a first alternative according to the invention, the compression means comprises a compression element disposed within the annular gap. The compression element may advantageously comprise the same material as the composite layer and preferably comprises carbon fibres disposed within a PEEK matrix.

The compression means according to the first alternative additionally comprises a collar end plate adapted to engage with the collar end face and to extend into the annular gap to engage the compression element. The collar end plate is typically made of metal and is advantageously made of steel.

The compression means according to the first alternative further comprises a crimping sleeve disposed between the compression element and the extension piece. The crimping sleeve is typically made of metal, preferably steel.

According to the first alternative, the attachment means forces the collar end plate into engagement with the collar end face and forces the compression element to act upon the crimping sleeve to compress the extension piece into sealing engagement with the exterior surface of the annular transition element. The attachment means may comprise any suitable device, such as a bolt.

In a second alternative according to the invention, the compression means comprises a compression block disposed within the annular gap. The compression block may advantageously comprise the same material as the composite layer and preferably comprises carbon fibres within a PEEK matrix.

The compression means according to the second alternative additionally comprises a collar end plate adapted to engage with the collar end face and to extend into the annular gap to engage the compression block. The collar end plate is typically made of metal and is advantageously made of steel.

The compression means according to the second alternative further comprises a compression sleeve disposed within the annular gap between the compression block and the pipe. The compression sleeve is typically made of metal, preferably stainless steel and may be configured similarly to or identically to the crimping sleeve.

The compression means according to the second alternative further comprises a filler element disposed between the pipe end and the annular transition element.

The filler element may advantageously comprise the same material as the composite layer and preferably comprises carbon fibres in a PEEK matrix.

According to the second alternative, the attachment means forces the collar end plate into engagement with the collar end face, which in turn forces:
  a) the compression block to compress the compression sleeve against the pipe end; and
  b) the filler element to compress the extension piece into sealing engagement with the exterior surface of the annular transition element.

If the composite pipe is armoured, then advantageously the apparatus additionally comprises an annular vault to anchor and protect the wires used for armouring. The annular vault has a proximal end and a distal end, wherein the proximal end is sealingly attached to the collar and the distal end is sealingly engaged with the pipe at a location remote from the pipe end and wherein the annular vault encloses the collar end face. The proximal end of the annular vault may be sealingly attached to the collar by a variety of means, such as via bolts or via a screw thread. Advantageously, attachment is via mating screw threads, which have the advantage of sealing uniformly around the entire periphery, whereas bolts may give rise to an uneven seal if they are not all tightened to the same degree.

BRIEF DESCRIPTION OF THE DRAWINGS

The invention will now be further described, by way of example only, and with reference to the accompanying drawings, in which.

DETAILED DESCRIPTION

Figure 1:
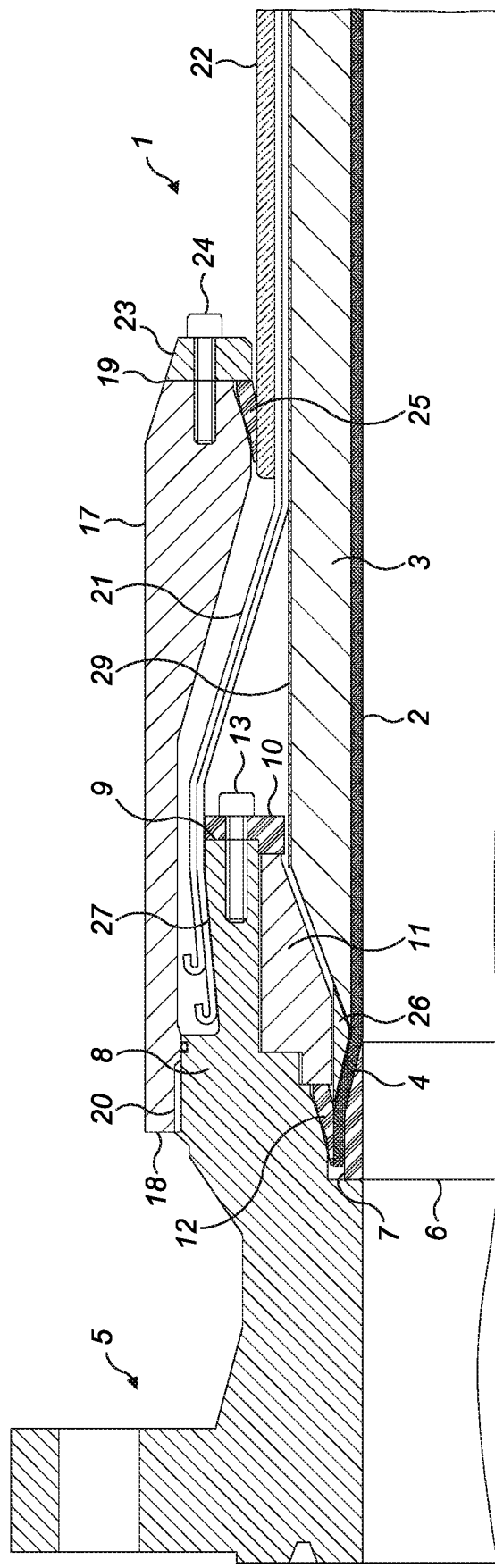
FIG. 1 illustrates a side view of a first end-fitting according to the invention.
Figure 2:
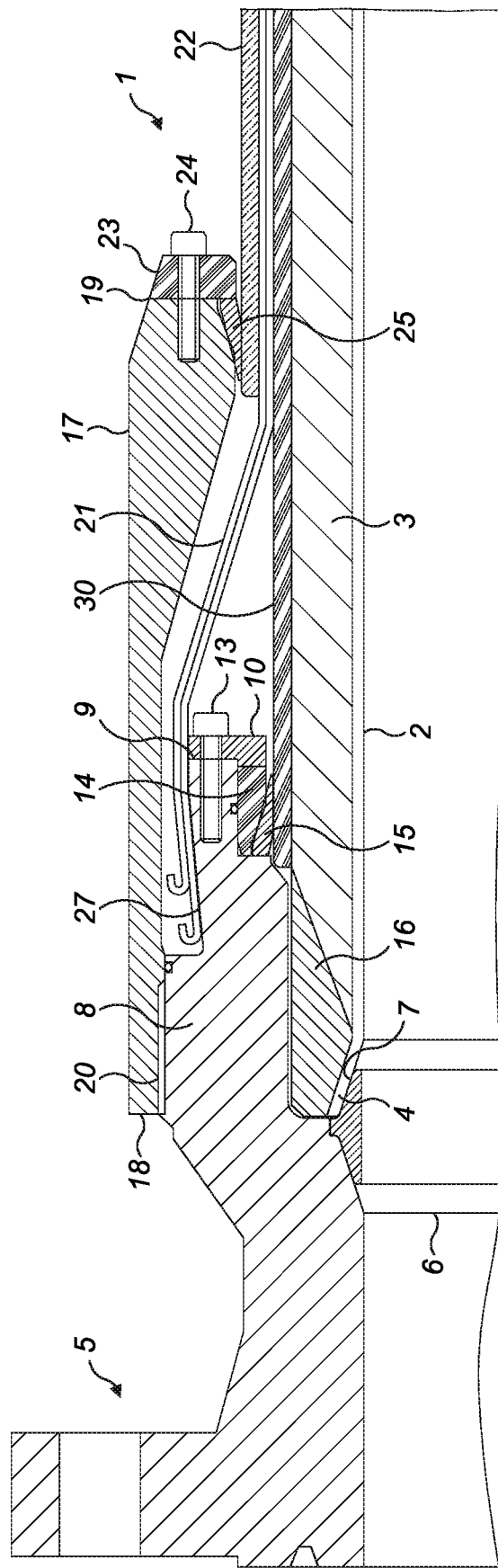
FIG. 2 illustrates a side view of a second end-fitting according to the invention.

FIGS. 1 and 2 disclose a first embodiment and a second embodiment respectively of an apparatus for terminating a composite pipe according to the invention.

Both embodiments illustrate an apparatus comprising a pipe (1) having a liner layer (2) made of PEEK surrounded by a composite layer (3). The composite layer is made of composite material comprising continuous, wound carbon fibres embedded in a PEEK matrix. The pipe is armoured with two layers of spirally wound armouring wires (21) which are enclosed within outer sheath (22) made of extruded polyethylene or extruded polypropylene configured which is present to protect the armouring from the external environment.

In the embodiments shown in the figures, the composite layer has been chamfered from towards the liner layer at the pipe end and the liner layer (2) includes an extension piece (4) which extends axially beyond the composite layer (3). A connector (5) is provided, made of steel, which, in both cases comprises a flange. An annular transition element (6) is also provided, located between the pipe end and the connector (5). The pipe (1), the annular transition element (6) and the connector (5) are sealingly engaged with and in fluid communication with one another, to allow the passage of fluid through their mutually connected central bores.

The annular transition element (6) of both embodiments comprises an exterior surface (7). In both embodiments of FIG. 1 and FIG. 2, the exterior surface (7) of the annular transition element (6) comprises a chamfered portion on the side adjacent to the pipe end and the compression means compresses the extension piece (4) into sealing engagement with the chamfered portion of the exterior surface (7).

As discussed below, compression means are provided in both embodiments which compress the extension piece (4) into sealing engagement with the exterior surface (7) of the annular transition element (6). The compression means will be discussed in more detail for each of the two embodiments.

In both the embodiments of FIG. 1 and FIG. 2, the connector comprises a collar (8), which extends around the annular transition element (6) and the pipe end and is radially spaced from the pipe end and radially spaced from at least a portion of the exterior surface (7) of the annular transition element (6) contiguous with the pipe end to define an annular gap. The collar (8) has an end face (9) which is aligned perpendicularly to the axis of the pipe. The collar (8) may include a ledge (27) on which the armouring wires (21) may terminate. The annular gap may also include one or more steps, such that the gap is not uniform along its axial length, as shown in FIGS. 1 and 2.

In both the embodiments of FIG. 1 and FIG. 2, the apparatus additionally comprises an annular vault (17), made of steel, having proximal end (18) and a distal end (19). The proximal end (18) is sealingly attached to the collar (8) and the distal end (19) is sealingly engaged with the pipe (1) at a location remote from the pipe end. In both cases, the proximal end (18) of the annular vault (17) is sealingly attached to the collar (8) by means of a screw threads (20), comprising a screw thread on the annular vault (17) which matingly engages with a corresponding screw thread on the collar (8). Furthermore, in both the embodiments of both FIG. 1 and FIG. 2, the distal end (19) of the vault is seelingly engaged with the pipe (1) by means of a vault end plate (23), made of steel, a bolt (24) and a crimping element (25) made of steel. Attachment of the vault end plate (23) to the vault via bolt (24) causes the crimping element (25) to be compressed against and sealingly engage with the outer sheath (22) of pipe (1). As can be seen from the figures, the annular vault encloses the annular transition element (6), the pipe end and the collar end face (9).

With reference to the embodiment of FIG. 1, the annular transition element is configured as a so-called "cannula", made stainless steel, the exterior surface (7) of which comprises the chamfered portion facing the pipe end, which is discussed above.

The compression means comprises a compression element (11), made of the same composite material as composite layer (3), which is disposed within the annular gap. Furthermore, a crimping sleeve (12), made of steel, is disposed between the compression element (11) and the extension piece (4). A collar end plate (10), made of steel, is provided to engage with the collar end face (9) and to extend into the annular gap to additionally engage the compression element (11). Attachment means (13), being a bolt in this case, forces the collar end plate (10) into engagement with the collar end face (9) and forces the compression element (11) to act upon the crimping sleeve (12) to compress the extension piece (4) into sealing engagement with the exterior surface (7) including the chamfered potion of the cannula. Typically, a sufficient pressure is applied to the liner layer for the compressive forces to reduce its thickness radially by 15-25% over the area in which the crimping sleeve (12) is in contact with the extension piece (4). Filler piece (26) is provided, made of the same composite material as composite layer (3), to fill the gap between the chamfered portion of the cannula, the chamfer of the composite layer (3) and the compression element (11). The filler piece avoids having a gap between the chamfered ends of the annular transition piece and the composite layer, which, if present, may allow the extension piece to be damaged, between the crimping sleeve (12) and the edge of the composite layer (3), when the pipe is subject to internal pressure during service.

The embodiment of FIG. 1 additionally comprises anti-friction layer (29) comprising polyethylene or polypropylene tape wound around the composite layer (3) and interposed between composite layer (3) and armouring wires (21). The tape is wound at an angle of 60-80 degrees to the pipe axis.

With reference to the embodiment of FIG. 2, the annular transition element (6) is configured as a gasket. In this embodiment, the exterior surface (7) comprises a central annular sealing ring to either side of which is a chamfered surface. In the art, this type of arrangement may be referred to as an "energised sealing gasket" which increases the contact area of the seal and therefore the strength of the seal as the internal pressure increases, so that in some circumstances a cannula/crimping sleeve arrangement of FIG. 1 may be replace by a gasket alone.

The compression means comprises a steel compression block (14) disposed within the annular gap. The compression means additionally comprises a collar end plate (10), made of steel adapted to engage with the collar end face (9) and to extend into the annular gap to additionally engage a compression block (14) disposed within the annular gap. The compression means also comprises a steel compression sleeve (15) disposed within the annular gap and a filler element (16), made of the same composite material as composite layer (3), disposed between the pipe end and the annular transition element (6). Attachment means (13), being a bolt in this case, forces the collar end plate (10) into engagement with the collar end face (9), which in turn forces:
  a) the compression block (14) to compress the compression sleeve (15) against the pipe end; and
  b) the filler element (16) to compress the extension piece (4) into sealing engagement with the exterior surface (7) of the annular transition element (6).

The embodiment of FIG. 2 additionally comprises an anti-friction and anti-wear inner sheath (30) disposed around the composite layer (3) and interposed between composite layer (3) and armouring wires (21). The inner sheath (30) has a similar construction to outer sheath (22) and comprises extruded polyethylene or polypropylene.

For completeness, the crimping sleeve (12), compression sleeve (15) and crimping element (25) are configured identically to one another.

The invention claimed is:

1. An apparatus for terminating a composite pipe comprises:
   a pipe having a liner layer surrounded by and bonded to a composite layer (3) of a polymer matrix comprising reinforcing fibres, and a pipe end, the liner layer comprising an extension piece which extends axially beyond the composite layer at the pipe end;
   a connector;
   an annular transition element located between the pipe end and the connector, the annular transition element having an exterior surface;
   compression means;
   the pipe, the annular transition element and the connector being in fluid communication with one another, to allow the passage of fluid therethrough;

whereby the compression means compresses the extension piece into sealing engagement with the exterior surface of the annular transition element.

2. The apparatus of claim 1, wherein the exterior surface of the annular transition element comprises a chamfered portion contiguous with the pipe end and the compression means compresses the extension piece into sealing engagement with the chamfered portion.

3. The apparatus of claim 1, wherein the connector comprises a collar, which extends around the annular transition element and the pipe end and is radially spaced from the pipe end and at least a portion of the exterior surface of the annular transition element contiguous with the pipe end to define an annular gap, the collar having an end face.

4. The apparatus of claim 3, wherein the compression means comprises:
 a compression element disposed within the annular gap;
 a collar end plate adapted to engage with the collar end face and to extend into the annular gap to engage the compression element;
 a crimping sleeve disposed between the compression element and the extension piece;
 attachment means which forces the collar end plate into engagement with the collar end face and which forces the compression element to act upon the crimping sleeve to compress the extension piece into sealing engagement with the exterior surface of the annular transition element.

5. The apparatus of claim 3, wherein the compression means comprises:
 a compression block disposed within the annular gap;
 a collar end plate adapted to engage with the collar end face and to extend into the annular gap to engage the compression block;
 a compression sleeve disposed within the annular gap between the compression block and the pipe;
 a filler element disposed between the pipe end and the annular transition element;
 attachment means which forces the collar end plate into engagement with the collar end face, which in turn forces:
 (a) the compression block to compress the compression sleeve against the pipe end; and
 (h) the filler element to compress the extension piece into sealing engagement with the exterior surface of the annular transition element.

6. The apparatus of claim 3 additionally comprising an annular vault having proximal end and a distal end, wherein the proximal end is sealingly attached to the collar and the distal end is sealingly engaged with the pipe at a location remote from the pipe end and wherein the annular vault encloses the collar end face.

7. The apparatus of claim 6, wherein the proximal end of the annular vault is sealingly attached to the collar by means of mating screw threads.

8. The apparatus of claim 1, wherein the composite material comprises carbon fibres disposed in a matrix of PEEK.

9. The apparatus of claim 1, wherein the liner layer comprises the same material as the matrix of the composite in the composite layer.

10. The apparatus of claim 1, wherein the composite comprises a thermoplastic matrix.

11. The apparatus of claim 1, wherein the reinforcing fibres within the composite comprise carbon fibres, glass fibres, or mixtures thereof.

12. The apparatus of claim 2, wherein the connector comprises a collar, which extends around the annular transition element and the pipe end and is radially spaced from the pipe end and at least a portion of the exterior surface of the annular transition element contiguous with the pipe end to define an annular gap, the collar having an end face.

13. The apparatus of claim 12, wherein the compression means comprises:
 a compression element disposed within the annular gap;
 a collar end plate adapted to engage with the collar end face and to extend into the annular gap to engage the compression element;
 a crimping sleeve disposed between the compression element and the extension piece;
 attachment means which forces the collar end plate into engagement with the collar end face and which forces the compression element to act upon the crimping sleeve to compress the extension piece into sealing engagement with the exterior surface of the annular transition element.

14. The apparatus of claim 12, wherein the compression means comprises:
 a compression block disposed within the annular gap;
 a collar end plate adapted to engage with the collar end face and to extend into the annular gap to engage the compression block;
 a compression sleeve disposed within the annular gap between the compression block and the pipe;
 a flier element disposed between the pipe end and the annular transition element;
 attachment means which forces the collar end plate into engagement with the collar end face, which in turn forces:
 (a) the compression block to compress the compression sleeve against the pipe end; and
 (b) the filler element to compress the extension piece into sealing engagement with the exterior surface of the annular transition element.

15. The apparatus of claim 12 additionally comprising an annular vault having proximal end and a distal end, wherein the proximal end is sealingly attached to the collar and the distal end is sealingly engaged with the pipe at a location remote from the pipe end and wherein the annular vault encloses the collar end face.

16. The apparatus of claim 4 additionally comprising an annular vault having proximal end and a distal end, wherein the proximal end is sealing), attached to the collar and the distal end is sealingly engaged with the pipe at a location remote from the pipe end and wherein the annular vault encloses the collar end face.

17. The apparatus of claim 12 additionally comprising an annular vault having proximal end and a distal end, wherein the proximal end is sealingly attached to the collar and the distal end is sealingly engaged with the pipe at a location remote from the pipe end and wherein the annular vault encloses the collar end face.

18. The apparatus of claim 15, wherein the proximal end of the annular vault is sealingly attached to the collar by means of mating screw threads.

19. The apparatus of claim 17, wherein the proximal end of the annular vault is sealingly attached to the collar by means of mating screw threads.

* * * * *